UNITED STATES PATENT OFFICE.

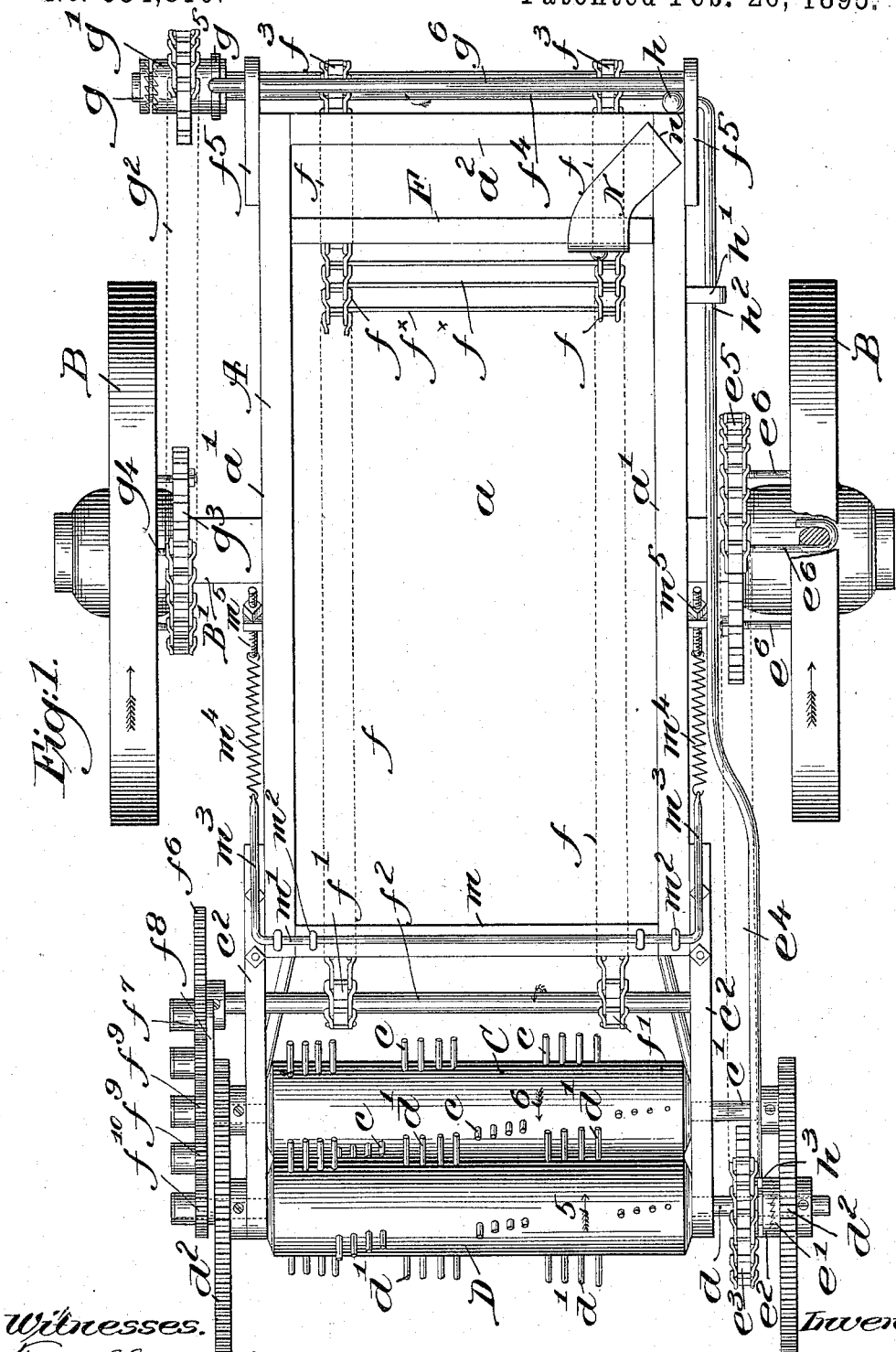

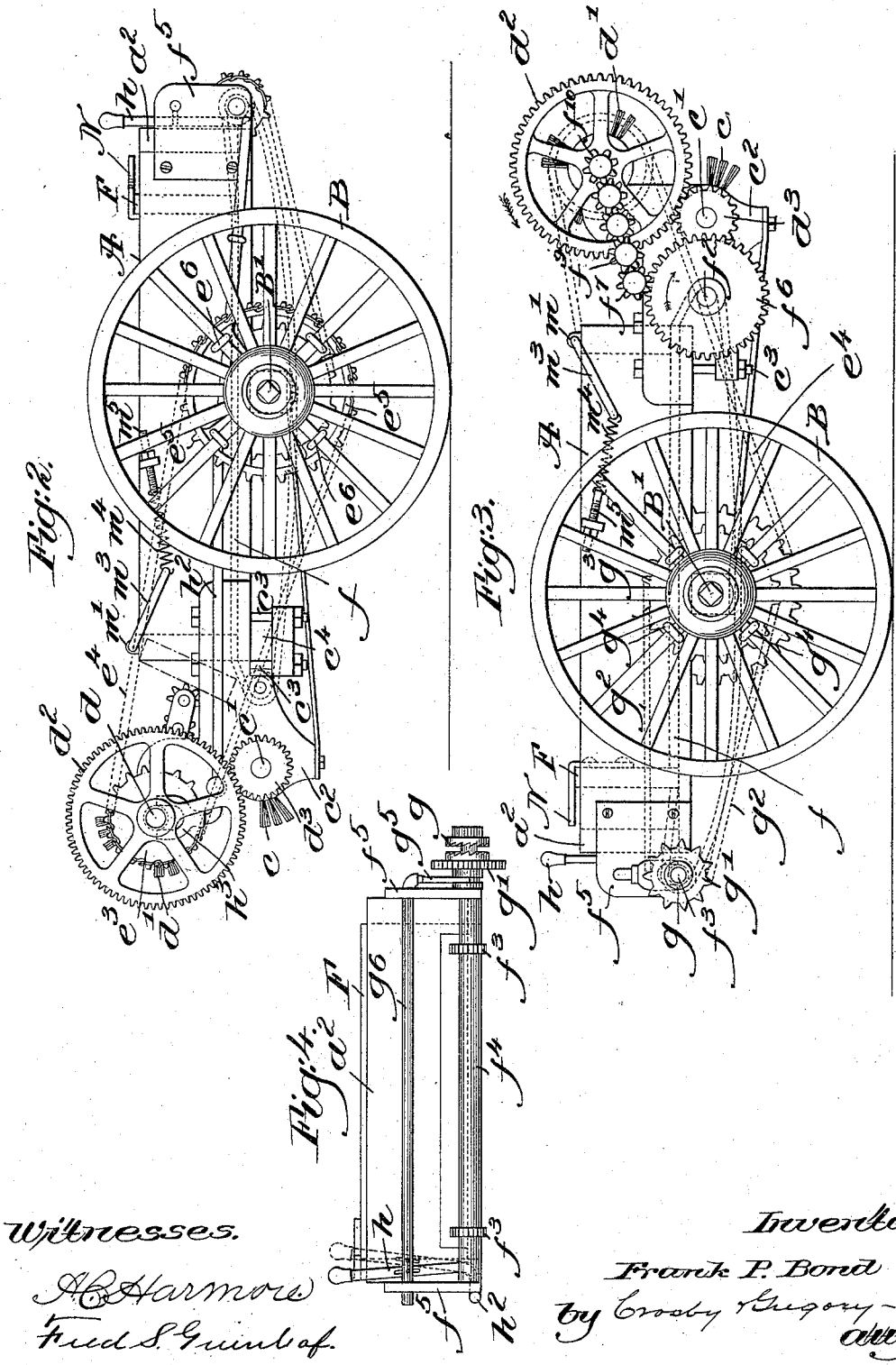

FRANK P. BOND, OF STOW, MASSACHUSETTS.

FERTILIZER-DISTRIBUTING ATTACHMENT FOR CARTS.

SPECIFICATION forming part of Letters Patent No. 534,810, dated February 26, 1895.

Application filed March 5, 1894. Serial No. 502,304. (No model.)

*To all whom it may concern:*

Be it known that I, FRANK P. BOND, of Stow, county of Middlesex, State of Massachusetts, have invented an Improvement in Fertilizer-Distributing Attachments for Carts, of which the following description, in connection with the accompanying drawings, is a specification, like letters on the drawings representing like parts.

This invention relates to fertilizer distributers for use on farms, the object of the invention being to provide a distributer which may be readily applied to and detached from carts or wagons now in use for various purposes upon a farm, and also a distributer in which the best results are obtained at a minimum expense. To this end I provide a rotating distributer mounted in suitable bearings so constructed as to be readily attached to and detached from the rear of the body of a cart, said distributer being connected in a suitable manner with and driven from a toothed wheel mounted upon the hub of one of the wheels upon which the cart body is mounted, said toothed wheel being attached to said wheel in such manner as will permit it to be readily detached from the wheel when not in use.

In connection with the distributer referred to, I preferably employ a rotating pulverizer co-operating with the distributer, and which may be driven thereby, the same acting to cut or pulverize the fertilizer before it is strewn upon the ground.

Suitable feeding mechanism is provided to feed the body of the fertilizer gradually toward the rear end of the body from which it is distributed upon the ground, which feeding mechanism may likewise be readily attached to and detached from the cart body at will.

My invention comprehends various other features, all of which will be hereinafter more fully described and set forth in the claims.

In the drawings, Figure 1 represents in top or plan view a cart equipped with a distributer embodying my invention; Figs. 2 and 3, side elevations from opposite sides of the cart; Fig. 4, a right-hand end view of the body, Fig. 2.

Referring to the drawings, A, is the body of a usual cart or wagon such as may be found upon all farms, the same being mounted upon suitable wheels B, as shown, there being in the present instance two wheels mounted upon a single central axle B'.

The body A is composed of a bottom $a$, sides $a'$, and front end $a^2$.

C represents the preferred form of pulverizer, shown as a cylinder provided with several series or groups of spurs or teeth $c$, said pulverizer having its end journals $c'$ mounted in suitable bearings in the brackets $c^2$ bolted or otherwise detachably secured to the rear end of the cart body, the said brackets in the present instance being secured by means of bolts $c^3$, see Fig. 2, to the projecting ends of the rear end cross-bar $c^4$ of the body frame. The brackets $c^2$, as herein shown, also contain bearings in which the journals $d$ of a distributer D are mounted, said distributer in its preferred form, as shown, consisting of a cylinder similar in shape and size to the cylinder of the pulverizer and provided with a plurality of groups or series of spurs or pins $d'$, which, during rotation of the distributer and pulverizer co-operate with the teeth of the latter to cut and separate or pulverize the fertilizing material before or as it is strewn upon the ground.

In the present embodiment of my invention, the pulverizer is driven by and from the distributer by means of the gear wheels $d^2$, $d^3$, the former keyed to the journals of the distributer, and the latter to the journals of the pulverizer, there being two sets of these wheels located respectively at opposite ends of the distributer and pulverizer.

The pulverizer and distributer are driven from one or both of the wheels of the cart in a suitable manner, I preferring, however, an arrangement such as is best shown in Fig. 1, wherein the inner end $e'$ of the hub of one of the wheels $d^2$ is toothed, as shown, to constitute one member of a clutch device, the other co-operating toothed member $e^2$ being arranged opposite to it and to slide upon said journal $d$. The member $e^2$, as shown, is formed as a part of the hub of a toothed or sprocket wheel $e^3$ loosely journaled upon the journal $d$ of the distributer and connected in a suitable manner, as by a sprocket chain $e^4$, with a sprocket toothed wheel $e^5$ upon the hub of one of the wheels B.

As herein shown, and preferably, the wheel $e^5$ is made to loosely fit the inner end of the hub of the wheel, and is attached to and to rotate with the said wheel by means of the hooked bolts $e^6$ which hook upon the spokes of the wheel and serve as detachable connections by which the said wheel $e^5$ may be readily attached to and detached from the said wheel.

It will be evident that rotation of the wheel B, to which the wheel $e^5$ is attached, in the direction of the arrow, caused by movement of the cart also in the direction of the arrow, will rotate the distributer in the direction of the arrow 5, and thereby the pulverizer in the direction of the arrow 6, Fig. 1.

F is what I term a pusher, the same being of a length substantially equal to the interior width of the body and of a height substantially equal to the sides of the body, said pusher having attached to it, as shown, the opposite ends of the two sprocket chains or belts $f, f$, shown as passed about wheels or sheaves $f'$ fast upon the shaft $f^2$ journaled in the brackets $c^2$ at the rear end of the body, and thence under the body to the front end thereof to and about the wheels or sheaves $f^3$ fast on the shaft $f^4$ journaled in brackets $f^5$ detachably secured to the front end of the body, as shown, movement of the sprocket chains in either direction causing similar movement of the pusher.

The shaft $f^2$ at the rear end of the body, see Fig. 3, has fast upon it a toothed wheel $f^6$ which is driven by a pinion $f^7$ journaled at the free end of an arm $f^8$ hinged upon one of the end journals of the distributer, the said pinion being connected by the intermediate gearing or pinions $f^9$ with a pinion $f^{10}$ fast on the said end journal of the distributer, as shown best in Fig. 3, so that rotation of the said distributer will act through the intermediate pinions $f^9$ and the pinion $f^7$ to rotate the toothed wheel $f^6$ and its shaft $f^2$, and thereby cause the sprocket chains $f, f$, to be drawn rearwardly, moving the pusher toward the rear end of the body.

It will be noticed that the pinions $f^7, f^9$, are journaled in an arm pivoted at one end upon one of the end journals of the distributer and free at its opposite end to be turned into position with the pinion $f^7$ raised above and disengaged from the teeth of the wheel $f^6$.

If, for any reason, such as the obstruction or clogging of the feeding chain or belt by a stone or other obstacle, the rotation of the wheel $f^6$ should be stopped, or excessively retarded to such an extent as would ordinarily cause breakage of some of the parts no damage can in my construction result, for continued rotation of the pinion $f^7$ from the journal of the distributer would simply cause said pinion $f^7$ to rise out of engagement with the teeth of the wheel $f^6$ and click past like a ratchet, so long as the obstruction remains, the feeding mechanism being thereby rendered inoperative for the time being.

Referring again to Fig. 1, the shaft $f^4$ at that side of the cart opposite the sprocket chain $e^4$ which drives the distributer is shown, provided with a hub $g$ toothed at its inner face, and constituting one member of a clutch device, the other toothed member $g'$ of which is in the form of a sprocket wheel loosely journaled and adapted to slide upon the said shaft, said sprocket wheel $g'$ being connected by a sprocket chain $g^2$ with and to be driven by a sprocket wheel $g^3$ secured upon the hub of the wheel B at its side of the cart by means of the bolts $g^4$, similar to the manner in which the wheel $e^5$ is secured to the hub of the other wheel B, as described.

It will be noticed that if the cart is moved always to the right or forward, Fig. 1, that the sprocket chains $f, f$, connected with the pusher may be moved rearwardly, i. e., toward the rear end of the body by the shaft $f^2$ when driven from the distributer by means of the pinions $f^7, f^9$ and $f^{10}$, and also that the said sprocket chains and pusher may be moved in an opposite direction by rotation of the shaft $f^4$ by the clutch device $g, g'$, and sprocket wheel $g^3$ at the opposite side of the cart.

In order to determine the direction of movement of the pusher, I have connected the movable clutch member $g'$ by means of a yoke $g^5$ and rod $g^6$ with a clutch operating lever $h$ pivoted in suitable bearings $h'$ at the side of the cart body, the pivotal shaft $h^2$ of said lever extending rearwardly along the side of the body to the rear end thereof, see Fig. 2, where it is turned upwardly and forked, as at $h^3$, to embrace a groove in the movable clutch member $e^2$ of the clutch which operates the distributer.

With the clutch operating lever $h$ in a central position, both movable clutch members $e^2$ and $g'$ are disengaged from their respective fixed members upon the shaft. If the clutch lever be moved to the left, Fig. 4, the clutch member $e'$ will be thrown into engagement with the member $e^2$ to throw the distributer and pulverizer into operative engagement with the driving wheel $e^5$, such movement of the said lever also moving the clutch member $g'$ farther out of engagement with its co-operating member $g$.

If the clutch member be moved from its central position to the right, Fig. 4, the clutch member $e^2$ will be disengaged from its co-operating member to throw out of engagement the distributer and pulverizer, and the member $g'$ will be thrown into engagement with its fixed member $g$ to cause the shaft $f^4$ to be rotated from and by the wheel $g^3$ upon the hub of the cart wheel.

The tail-board $m$, fitted between the sides of the body at the rear end of the latter, is hinged at $m'$ at its upper edge in suitable bearings $m^2$, see Fig. 1, said tail-board being provided with arms $m^3$ connected by springs $m^4$ with the adjusting and holding screws $m^5$ upon the sides of the body. When the cart is in use, the pressure of the fertilizer fed toward the rear of the body by the pusher, tilts this tail-board out into its dotted line position, Fig. 2, against the action of its springs, the speed of the feed taken in connection with the tension to which the springs are adjusted, regulating the opening of the tail-board under which the fertilizer may escape to the pulverizer.

In practice I prefer to connect the sprocket chains $f, f$, at the rear of the pusher by properly spaced rods or bars $f^x$, which, together with the said chains serve as feeders for the fertilizer, as will be described.

The operation of the device is as follows: Assuming that the pusher F is at the right, Fig. 1, in substantially the position shown, the fertilizer, of whatever kind it is desired to use, is deposited within the body in such quantity as can be readily carried, and the clutch lever $h$ thrown to the left, Fig. 4, thereby moving the clutch member $e^2$ into engagement with its co-operating member $e'$, and throwing the distributer and pulverizer into driving engagement with the wheel $e^5$. The cart is now driven at a proper speed over the piece of ground which is to be fertilized, the rotation of the wheel B to which the sprocket wheel $e^5$ is attached, acting through the sprocket chain $e^4$ to rotate the distributer in the direction of arrow 5, and the pulverizer in the direction of arrow 6, the two co-operating, as described, to pulverize and scatter the fertilizer upon the ground. The shaft $f^2$ is also rotated by the pinions $f^7$, $f^9$ and $f^{10}$ in the direction of arrow 7, Fig. 1, to move the sprocket chains $f$ with their cross-bars, constituting the feeding device, and the pusher F, gradually toward the rear of the body to push the body of fertilizer constantly toward the tail-board as fast as it is scattered by the distributer upon the ground, the tail-board, under the tension of its springs, regulating the quantity delivered to the distributer, in the manner described. When the fertilizer has been entirely distributed, and the pusher F, in its rearward movement, contacts with the tail-board, thereby preventing further movement of the said pusher, continued forward movement of the cart can do no damage, for the distributer and pulverizer simply rotate without doing any work, and the pinion $f^7$ rises from engagement with the toothed wheel $f^6$, as described, clicking past without rotating the said wheel $f^6$ and its shaft. The operator, without changing the direction in which the cart is driven, now turns the clutch lever $h$ from its position at the left, Fig. 4, into its extreme right-hand position, thereby throwing out of engagement the clutch member $e^2$, and throwing the clutch member $g'$ into engagement with its co-operating member $g$ to cause the shaft $f^4$ to be rotated in the direction of the arrow thereon, Fig. 1, for the purpose of returning the pusher F again to its forward full line position, Fig. 1, in proper position for the body to receive a new load of the fertilizer. When the pusher F has reached the end of its forward movement, the inclined face $n$ of the cam plate N strikes the clutch lever $h$ and throws the latter into its middle position, thereby automatically disengaging the clutch member $g'$, and leaving both clutches out of proper engagement. The speed of the pulverizer is preferably more than double that of the distributer, the difference in rotative speed of the two serving to better cut up or pulverize the fertilizer before it is strewn upon the ground.

It will be noticed that the pulverizer, distributer, and all other parts at the rear of the body, are carried by the brackets $c^2$ which are readily detachable from the cart body when it is desired to use the cart for other purposes. The shaft $f^4$ and other parts at the front of the body are carried in brackets $f^5$, likewise readily detachable from the body. The sprocket driving wheels $e^5$ and $g^3$ are also readily detachable from the wheels B of the cart, thereby making it possible to completely remove all the parts of the distributing mechanism in a short time when the cart is to be used for other purposes. This is an important feature of my invention, for the distributing attachment may be so sold and applied to any of the ordinary tip-carts now in use upon every farm, thereby reducing the expense of a fertilizing distributer.

This invention is not limited to the particular construction of device or mechanism herein shown, for it is evident that the same may be varied in many ways without departing from the spirit and scope of my invention as claimed.

I claim—

1. A body, wheels on which the same are mounted, combined with a traveling pusher, means operated by said wheels to impart a feeding and a return movement to said pusher, and devices actuated by said pusher at or near the limit of its return movement to automatically stop said return movement, substantially as described.

2. A device of the class described containing the following instrumentalities, viz:—a body, wheels on which the same is mounted, a distributer driven from one of said wheels,— a clutch device by which to connect and disconnect said clutch from said wheel, a pusher, driving mechanism for the same operated by one of said wheels, a clutch device to control said driving mechanism, and a common clutch lever by which to control both said clutches, substantially as described.

3. A device of the class described, containing the following instrumentalities, viz:—a body, sustaining wheels therefor, a distributer, driving mechanism therefor operated by one of said wheels, a clutch device to control said driving mechanism, a feeder, driving mechanism therefor operated by one of said wheels,— a clutch device to control said driving mechanism, and a common clutch lever connected with both clutches, said lever when thrown to one extreme position throwing one of said clutches into operative engagement, and when thrown in an opposite direction throwing the other of said clutches into operative engagement, and when in a third position moving both said clutches into disengaging position, substantially as described.

4. A device of the class described, containing the following instrumentalities, viz:—a body having a permanent stationary bottom; sustaining wheels for said body; a distributer, and means to operate the same; a feeder moving upon and sustained by said bottom, and a pusher connected with said feeder; means to drive the said pusher and feeder, rendered automatically inoperative by excessive retardation of such movement, substantially as described.

5. A device of the class described containing the following instrumentalities, viz:—a body, sustaining wheels therefor, a distributer and means to operate the same, a feeder movable longitudinally along the body bottom, and means to drive the same rendered automatically inoperative by excessive retardation of such movement due to any obstruction in the fertilizer, substantially as described.

6. A body, and sustaining wheels therefor; a distributer; its bearings; supports for the said bearings, and means to detachably connect said support to said body; a toothed wheel, and means to detachably connect it to one of said sustaining wheels; sprocket chains to connect said toothed wheels and to operate said distributer; the traveling feeder upon the body bottom; shafts at opposite ends of the body bottom about which the same is passed, one of said shafts being mounted in the said supports, and the other of said shafts in brackets detachably connected to the front end of said body, all substantially as described.

In testimony whereof I have signed my name to this specification in the presence of two subscribing witnesses.

FRANK P. BOND.

Witnesses:
FREDERICK L. EMERY,
AUGUSTA E. DEAN.